United States Patent
Man et al.

(10) Patent No.: US 11,341,661 B2
(45) Date of Patent: May 24, 2022

(54) METHOD AND APPARATUS FOR REGISTERING LIVE MEDICAL IMAGE WITH ANATOMICAL MODEL

(71) Applicant: SONOSCAPE MEDICAL CORP., Shenzhen (CN)

(72) Inventors: Junzheng Man, Bellevue, WA (US); Xuegong Shi, Redmond, WA (US); Guo Tang, Bellevue, WA (US)

(73) Assignee: SONOSCAPE MEDICAL CORP., Shenzhen (CN)

( * ) Notice: Subject to any disclaimer, the term of this patent is extended or adjusted under 35 U.S.C. 154(b) by 178 days.

(21) Appl. No.: 16/731,189

(22) Filed: Dec. 31, 2019

(65) Prior Publication Data

US 2021/0201512 A1    Jul. 1, 2021

(51) Int. Cl.
*G06K 9/00* (2022.01)
*G06T 7/33* (2017.01)

(52) U.S. Cl.
CPC .... *G06T 7/344* (2017.01); *G06T 2207/10081* (2013.01); *G06T 2207/20081* (2013.01); *G06T 2207/20084* (2013.01); *G06T 2207/30004* (2013.01)

(58) Field of Classification Search
CPC .......... G06T 7/344; G06T 2207/10081; G06T 2207/20081; G06T 2207/20084; G06T 2207/30004; G06T 2207/10132; G06T 2207/10136
See application file for complete search history.

(56) References Cited

U.S. PATENT DOCUMENTS

| | | | | |
|---|---|---|---|---|
| 2009/0163810 A1* | 6/2009 | Kanade | .................. | A61B 5/065 600/443 |
| 2017/0372473 A1* | 12/2017 | Ujiie | ..................... | G06F 3/0482 |
| 2018/0350064 A1* | 12/2018 | Man | ..................... | A61B 8/5246 |
| 2020/0202507 A1* | 6/2020 | Ceccaldi | ................ | G06N 3/084 |
| 2021/0059762 A1* | 3/2021 | Ng | ......................... | G06T 17/20 |

* cited by examiner

*Primary Examiner* — Atiba O Fitzpatrick
(74) *Attorney, Agent, or Firm* — Hauptman Ham, LLP (57) ABSTRACT

Described herein is a method of registering a medical image of a subject with a 3D model of a subject, including calibrating the 3D model globally by aligning markers on the subject with corresponding markers on the 3D model; and calibrating the 3D model locally by aligning a scanning image of an internal structure of the subject with a corresponding internal structure of the 3D model. Also described herein is an apparatus of performing the method.

10 Claims, 6 Drawing Sheets

METHOD AND APPARATUS FOR REGISTERING LIVE MEDICAL IMAGE WITH ANATOMICAL MODEL

BACKGROUND

Medical imaging involves techniques and processes for creating a visual representation of an interior of a living body, such as a patient. The visual representation, often referred to as a "medical image", reveals operations or functioning of an organ, a tissue, or a structure of the living body that are not otherwise observable from an exterior of the living body. A medical practitioner, such as a medical doctor or a veterinarian, may refer to the visual representation as part of a medical diagnosis or clinical analysis, and subsequently determine whether or how a medical intervention or treatment may be applied to the living body.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE PREFERRED EMBODIMENTS

The detailed description of the present disclosure is presented largely in terms of procedures, steps, logic blocks, processing, or other symbolic representations that directly or indirectly resemble the operations of devices or systems contemplated in the present disclosure. These descriptions and representations are typically used by those skilled in the art to most effectively convey the substance of their work to others skilled in the art.

Reference herein to "one embodiment," "an embodiment" or "some embodiments" means that a particular feature, structure, or characteristic described in connection with the embodiment can be comprised in at least one embodiment of the present disclosure. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the present disclosure do not inherently indicate any particular order nor imply any limitations in the present disclosure.

In some embodiment, the instant specification is directed to a method and an apparatus of registering a medical image of a subject with an anatomical model of the patient. In some embodiments, the methods and apparatus are implemented in various clinical medical or diagnosis applications including ultrasonography scanning.

In some embodiment, the subject is a human. In some embodiment, the subject is an animal. The instant specification will describe the methods of apparatus in reference to a human subject for the sake of simplicity. However, one of ordinary skill in the art would understand that the method or the apparatus applies to an animal subject or other subjects.

A major challenge of medical imaging resides in a non-intuitive nature of the visual representation. This non-intuitive nature makes correct interpretations of the medical image more difficult. In some instance, years of extensive medical training are conducted before a practitioner can interpret or otherwise comprehend a medical image with satisfactory accuracy and detail.

In some applications, a medical image constitutes a two-dimensional (2D) cross-section of a body anatomy of a patient, rather than a three-dimensional (3D) replica of the actual body object being examined, be the body object an organ, a tissue or a structure. Therefore, establishing a correlation between the 2D medical image and the anatomy of the body object is not trivial. In other words, identifying which anatomical cross-section of the 3D body object the 2D medical image represents, as well as what internal structures are shown in the anatomical cross-section, is not trivial.

Therefore, finding a more intuitive way to correlate the 2D medical image with the 3D body object being examined will help with accurate medical evaluation.

Method of Registering a Medical Image of a Subject with a 3D model

Figure 1A:
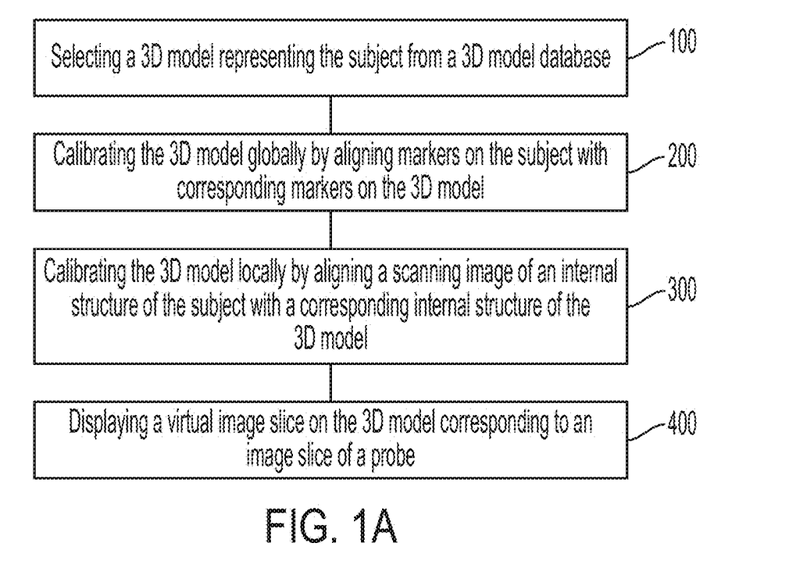
FIG. 1A is a flowchart and a diagram of a method of registering a medical image in accordance with some embodiments
Figure 1B:
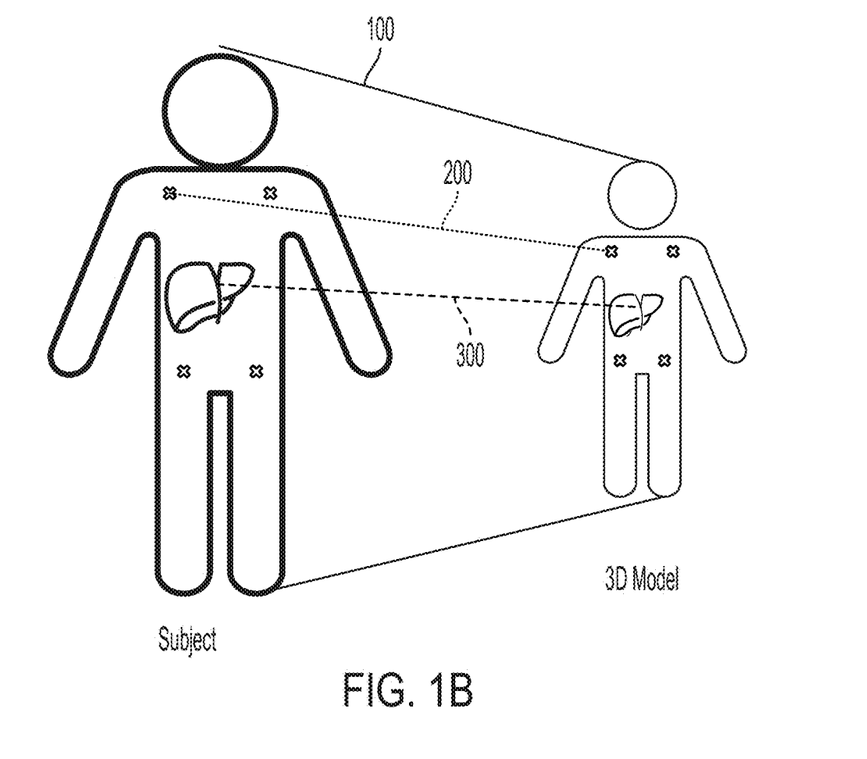
FIG. 1B is a medical image of a subject with a 3D model of the subject in accordance with some embodiments.

Refer to FIG. 1A and FIG. 1B, in some embodiments, the specification is directed to a method of registering a medical image of a subject with a 3D model of the subject.

In some embodiments, the method includes selecting a 3D model representing the subject from a 3D model database 100, calibrating the 3D model by aligning markers on the subject with corresponding markers on the 3D model 200; and calibrating the 3D model by aligning scanning image of an internal structure of the subject with a corresponding internal structure of the 3D model 300. As used herein, the phrase "internal structure" means structures of the body of the subject not exposed on an external surface of the subject. The internal structures include organs, tissues under skins, etc.

In some embodiment, step 100 can be omitted and the 3D model of the subject used in step 200 or 300 is a generic or universal model that is equally applicable to various subjects of different genders, heights, weights, ethnicities, ages, and the like. According to these embodiments, entry of subject-specific information is not used for registering the medical image with the 3D model. However, due to the variations of external and internal dimensions of human individuals, choosing the 3D model from a 3D model database based on the subject-specific information would result in a 3D model having dimensions closer to the subjects, thereby making the calibration steps 200 and 300 (described in detail below) more accurate and less computational intensive.

A large amount of 3D human models are available in the gaming and animation industry. Although many of the 3D human models in the gaming and animation industry do not meet the medical grade requirements, some models are able to meet these requirements. Furthermore, as detailed below, 3D models can be calibrated to better represent the external and internal dimensions of a subject. The calibrated 3D models can be stored and used as initial uncalibrated 3D model for a second subject, and be calibrated for the second subject. Therefore, in some embodiments, the 3D model database includes 3D human models from the gaming or animation industry.

3D models used for anatomy studies generally have better quality than 3D human models available in the gaming and animation industry. In addition, these 3D models often include internal structures of human body such as organs. Therefore, in some embodiments, the 3D model database includes 3D models used for anatomy studies. In some embodiments, the 3D model database includes 3D models from the visible human project, which are reconstructed from pictures of slices of cadaver. Since 3D models from the visible human project models are constructed from real humans, the qualities of these 3D models are good at least because of the high resolutions and the real anatomical features.

Figure 2:
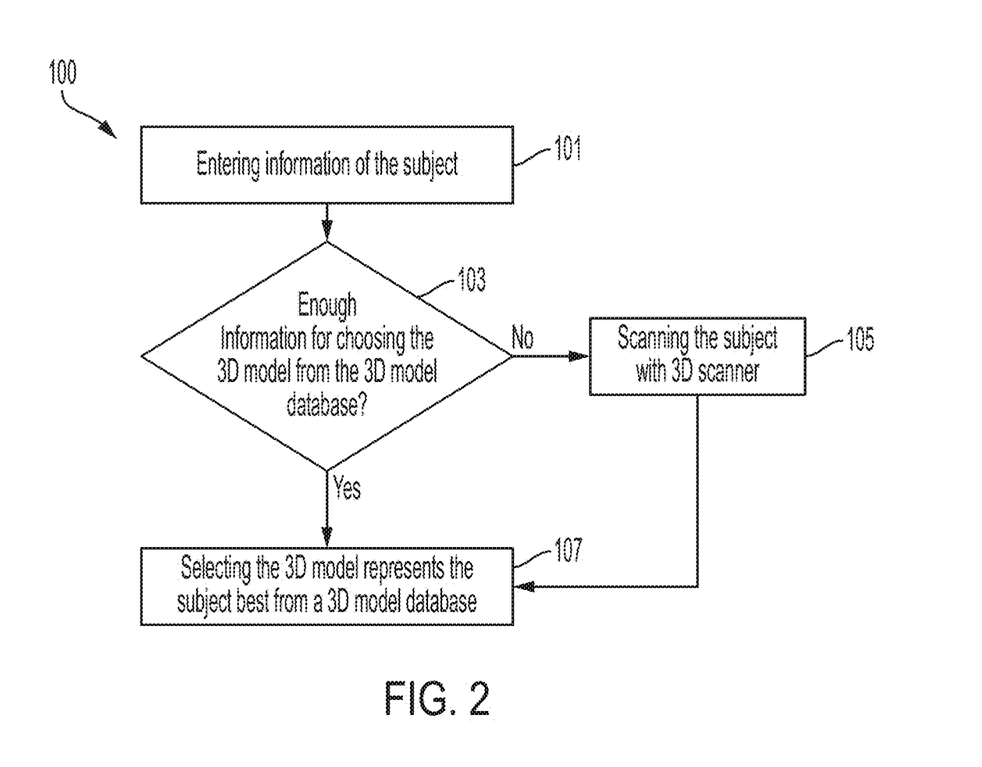
FIG. 2 is a flowchart of a method of selecting a 3D model representing the subject from a 3D model database in accordance with some embodiments.

Refer to FIG. 2, in some embodiments, selecting the 3D model representing the subject from the 3D model database 100 includes selecting the 3D model based on information of the subject.

In some embodiments, the 3D model database includes entries of 3D models representing bodies of subjects. In some embodiments, the entries of the 3D models include not only the external shape of subjects, but also internal structures of the subjects. In some embodiments, each entry of the 3D models is tagged with information related to the entry, such as external dimensions or dimensions of internal structures.

In some embodiments, selecting the 3D model representing the subject from the 3D model database 100 includes entering information of the subject 101.

In some embodiments, the information of the subject is entered into a memory of a computer. In some embodiments, the information includes demographic information of the subject, such as gender, height, weight, ethnicity, age, and the like of the subject. In some embodiments, the information includes personal information of the subject, such as body measurements, body fat percentage (BFP), body mass index (BMI), and the like. In some embodiments, both demographic information and personal information are included.

The demographic information or personal information of the subject, if sufficient, allows the estimations of the external dimensions of body of the subject, or even the estimations of the dimensions of internal structures such as organs of the subject.

Therefore, in some embodiments, selecting the 3D model representing the subject from the 3D model database 100 further includes determining whether the information entered is sufficient 103. In some embodiments, the determination is made by a processor of a computer. In some embodiments, the processor assigns a value to each item entered and calculate a total value. If the total value is larger than or equal to a predetermined value, the processor determines that the information entered in step 101 is sufficient for choosing the 3D model; if the total value is small than the predetermined value, the processor determines that the information entered in step 101 is insufficient.

In some embodiments, when step 103 determines that the information entered in step 101 is insufficient, selecting a 3D model representing the subject from a 3D model database 100 further includes scanning the subject with a 3D scanner 105.

In some embodiments, the 3D scanner includes a smart phone having a camera and installed with a 3D scanning app, a professional 3D scanner such as a medical 3D scanner, or a computed tomography scanner (also referred to as "computerized axial tomography scanner", "CT scanner" or "CAT scanner", hereinafter "CT scanner"). The smart phone is a cheap and readily available option, but only allows rough estimations of external dimensions of the subject. The professional 3D scanner is more expensive, but allows fairly accurate estimations of external dimensions of the subject. The CT scanner is generally the most expensive and the least available and would cause irradiation to the subject, but allows very accurate estimations of both external dimensions and dimensions of internal organs of the subject. Therefore, the choice of the 3D scanners should be made in consideration of the cost and the benefit of the particular type of the scanner. After the 3D scanning step 105, selecting the model that represents the subject best from the database 107 is proceeded to.

In some embodiments, when step 103 determines that the information entered in step 101 is sufficient, selecting the model that represents the subject best from the database 107 is proceeded to without proceeding to step 105.

In step 107, the dimensions of the subject (including external dimensions or dimensions of internal organs) can either be estimated from the demographic/personal information of the subject entered in step 101, or be estimated from the results of 3D scanning from step 105. In some embodiments, the estimation of dimension is performed by a processor. In some embodiments, the estimated dimensions are matched with dimensions of 3D models stored in the database. In some embodiments, the 3D models stored in the database are tagged with relevant demographic/personal information and the matching is based directly on the demographic/personal information; according to these embodiments, the estimation of dimensions of the subject may or may not be omitted. In some embodiments the matching is performed by the processor. In some embodiments, the 3D model that having dimensions with the best match with the estimated dimension is chosen from the database by the processor.

Figure 3A:
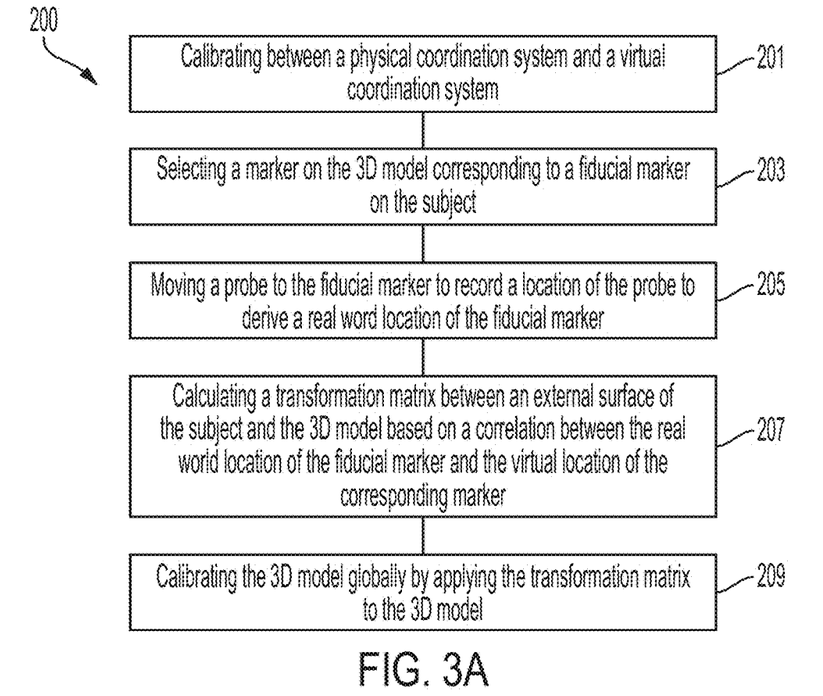
FIG. 3A is a flowchart of a method of calibrating the 3D model globally by aligning markers on the subject in accordance with some embodiments.
Figure 3B:
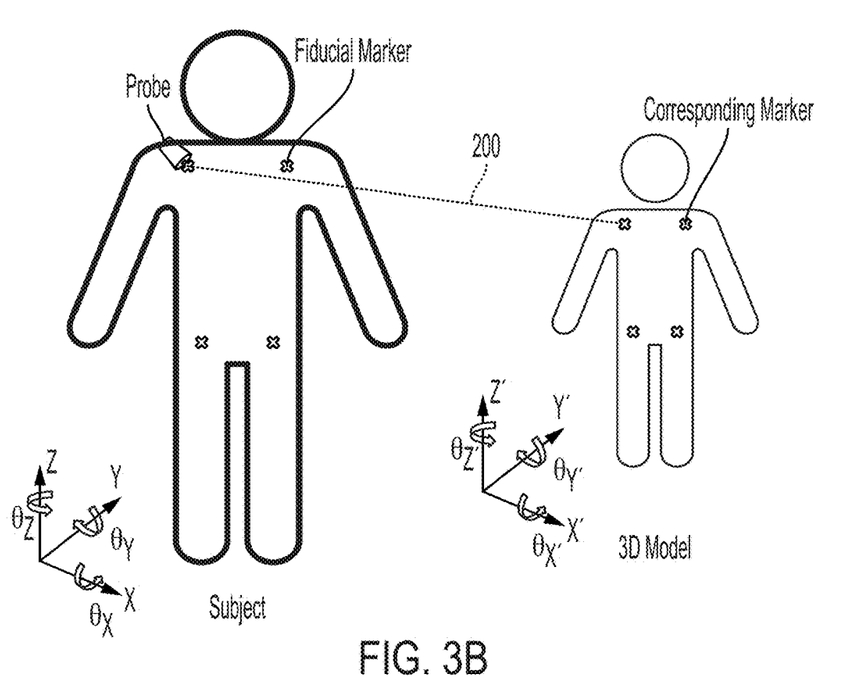
FIG. 3B is a medical image of a subject with marking and corresponding markers on the 3D model in accordance with some embodiments.

Referring to FIG. 3A and FIG. 3B, in some embodiments, calibrating the 3D model globally by aligning markers on the subject with corresponding markers on the 3D model 200 performs the calibration using fiducial markers. The use of fiducial markers is described in U.S. application Ser. No. 15/610,127, the entirety of which is hereby incorporated by reference.

In some embodiments, calibrating the 3D model globally by aligning markers on the subject with corresponding markers on the 3D model 200 includes calibrating between a physical coordination system and a virtual coordination system 201. Refer to FIG. 3B, as used herein, the term "physical coordinate system" refers to the coordinate system representing a real world space in which the subject is located (as represented by the coordinate system having axes X, Y and Z in FIG. 3B), and the term "virtual coordinate system" refers to the coordinated system of a virtual space in which the 3D model is located (as represented by the coordinate system having axes X', Y' and Z' in FIG. 3B).

In some embodiments, calibrating between a physical coordination system and a virtual coordination system 201 includes moving a probe attached to, or including, a position sensor to one or more real world space locations corresponding to locations in the virtual space, and determining the real world coordination of the position sensor by a navigation transducer. In some embodiments, the position sensor and the navigation transducer are a part of a tracking system. In some embodiments, the tracking system is a GPS tracking system, an optical tracking system or an electromagnetic tracking system. In some embodiments, the tracking system is a 3 degrees of freedom (3DOF) tracking system that tracks rotation on X, Y and Z axes ($\theta_X$, $\theta_Y$ and $\theta_Z$). In some embodiments, the tracking system is a 6DOF tracking system that tracks both position and rotation on X, Y and Z axes. One of ordinary skill in the art would understand that the 3DOF tracking system is relatively cheap but less accurate; the 6DOF tracking system is more expensive but allows tracking both the location and the orientation of the position sensor and the probe.

In some embodiments, calibrating the 3D model globally by aligning markers on the subject with corresponding markers on the 3D model 200 includes selecting a marker on the 3D model corresponding to a fiducial marker on the subject 203.

In some embodiments, calibrating the 3D model globally by aligning markers on the subject with corresponding markers on the 3D model 200 further includes moving a probe to the fiducial marker to record a location of the probe to derive a real world location of the fiducial marker 205. In some embodiments, recording the location of the probe can be performed using the tracking system including the position sensor or the navigation transducer in manners similar to those as described above.

Although one of ordinary skill in the art would expect that the more the fiducial markers are used in the calibration the more accurate the calibration result would be, the instant inventors have found that larger numbers of fiducial markers often do not necessarily translate to better calibration results. Therefore, in some embodiments, a number of the fiducial marker ranges from 1 to 10, such as 2 to 8, such as 2 to 6, such as 3 to 5. The choice of the number of fiducial markers depends on the part of the body the calibration should be made. For example, when an ultrasound scanning is to be performed targeting only the abdomen of the subject, only fiducial markers in or near the abdomen are used as accurate calibration is only required in the abdomen area in some embodiments. Similarly, if an ultrasound scanning is to be performed targeting only the brain of the subject, only fiducial markers on or near the head are used, in some embodiments.

As moving the probe to the fiducial marker to record the location of the probe may take some time and during this time the subject may not be able to maintain position, in some embodiments, step 205 includes deriving a relative position of the fiducial marker on the subject. According to these embodiments, a reference sensor is attached to the subject, and the position of the fiducial marker in relative to the reference sensor is derived by a processer using inputs by the position sensor, the navigational transducer and the reference sensor. The reference sensor works well in the calibration of torso region of the subject, as the external portions of the torso can be considered as rigid. One of ordinary skill in the art would understand that the reference sensor can be used in a similar manner as described here in the local calibration step 300, as well.

In some embodiments, calibrating the 3D model globally 200 further includes calculating a transformation matrix between an external surface of the subject and the 3D model based on a correlation between the real world location of the fiducial marker and the virtual location of the corresponding marker 207. In some embodiments, the transformation matrix is a rigid transformation matrix or an affine transformation matrix. In some embodiments, the transformation matrix is one that can transform any positions back and forth between the two coordinate systems. In some embodiments, the transformation matrix is one that is able to handle translation, rotation and scale between the two sets of marker coordinates. In some embodiments, calculating the transformation matrix 207 can be performed using an algorithm that is able to calculate homogeneous scaling across all 3 directions, or an algorithm that is able to give different scale factors in different directions. The instant inventors have discovered that algorithms that can give different scale factors in different directions are able to address the difference between the size of the 3D model and the subject in some degree better.

In some embodiments, calibrating the 3D model globally 200 further includes calibrating the 3D model globally by applying the transformation matrix to the 3D model 209.

Referring to FIGS. 4A, 4B, 4C and 4D, in some embodiments, the method of registering the medical image of the subject with the 3D model includes calibrating the 3D model locally by aligning a scanning image of an internal structure of the subject with a corresponding internal structure of the 3D model 300.

The instant inventors have discovered that, although either a global calibration or a local calibration sometimes produces useful results, the combination of both the global calibration and the local calibration has synergistic effect. Using torso as example, the global calibration addresses the orientation, placement and scale differences of the torsos between subject and 3D model. The relative location and orientation of a structure such as liver within the torso can still vary significantly among different subjects. The local calibration addresses such relative difference within the torso. In other words, the global calibration and the local calibration, when both are performed, produce results far more satisfactory than either global calibration alone or the local calibration alone.

Figure 4A:
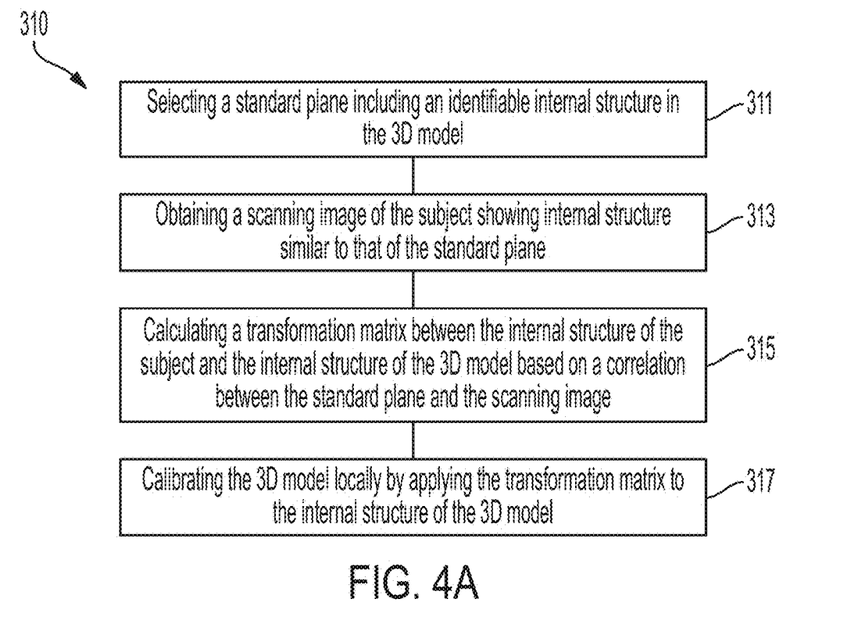
FIG. 4A is a flowchart of calibrating the 3D model locally by aligning a scanning image of an internal structure of the subject with a corresponding internal structure of the 3D model in accordance with some embodiments.

Although the global calibration step 200 is able to calibrate the 3D model regarding the position, orientation and scale to address the difference between the 3D model and the subject, step 200 only calibrates the external dimensions of the 3D model. However, one of ordinary skill in the art would understand that, for different subjects, the internal structures' location and orientation are often different. Because the internal structures are not exposed, placing sensors on the internal structures are not feasible. This makes the use of fiducial marker as described in step 200 not possible. To address such difference in internal structures, local calibration step 300 is proceeded to align the specific internal structures between the 3D model and the subject.

Although the internal structures of different subjects may have different positions and orientations, the overall shapes of the internal structures are similar. As such, the local calibration step 300 can be performed either as a correlation between a scanning image of the internal structure and a standard plane 310 (see FIGS. 4A and 4B), or as a correlation between a reconstructed 3D model of the internal structure of the subject and the internal structure of the 3D model 320 (see FIGS. 4C and 4D).

Figure 4B:
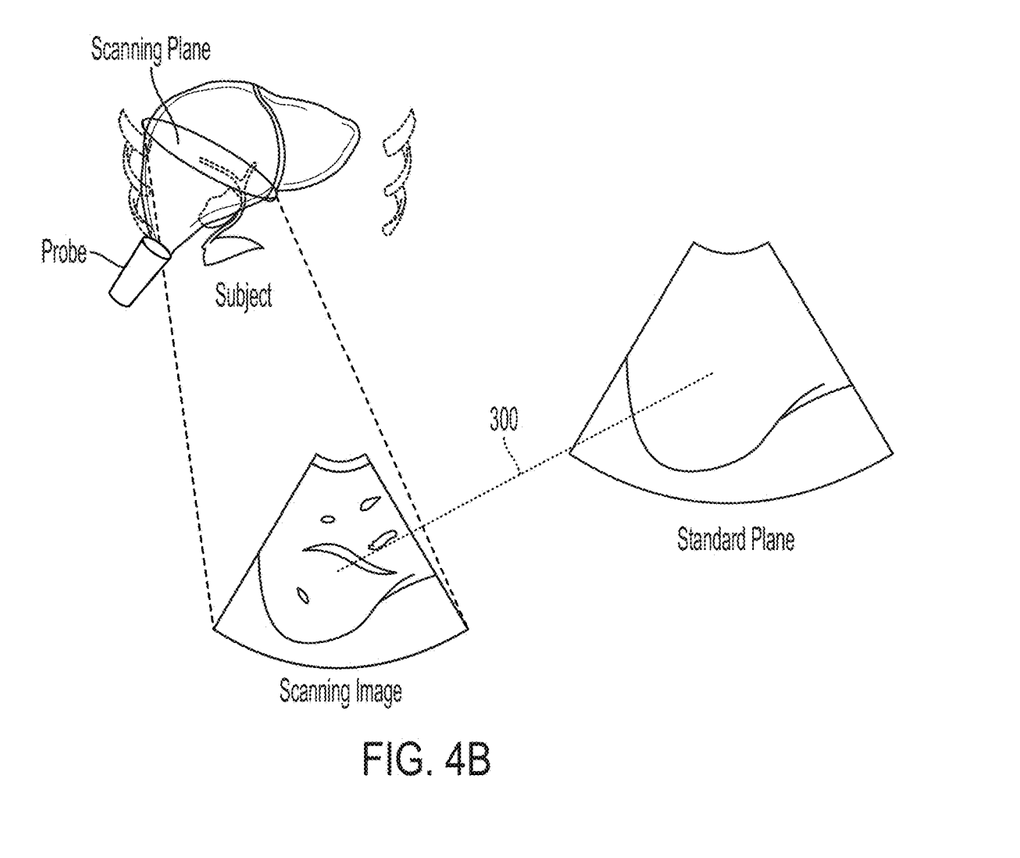
FIG. 4B is a medical image of a subject, a scanning image and a standard plane in accordance with some embodiments.

Referring to FIGS. 4A and 4B, in some embodiments, performing step 300 by correlating a scanning image of the internal structure and a standard plane 310 includes: selecting a standard plane including an identifiable internal structure in the 3D model 311; obtaining a scanning image of the subject showing internal structure similar to that of the standard plane 313; calculating a transformation matrix between the internal structure of the subject and the internal structure of the 3D model based on a correlation between the standard plane and the scanning image 315; and calibrating the 3D model locally by applying the transformation matrix to the internal structure of the 3D model 317.

In some embodiments, selecting the standard plane including the identifiable internal structure in the 3D model 311 includes selecting a standard plane showing a unique cross-section of the internal structure. The instant inventors have discovered that, for many organs, one unique cross-section standard plane is sufficient for the local calibration of the organs.

In some embodiments, obtaining the scanning image of the subject showing internal structure similar to that of the standard plane 313 includes displaying a virtual probe in the virtual coordinate system and indicating on which scanning plane the scanning image is being taken. According to these embodiments, placing of the probe by the operator can be simplified when obtaining the scanning image.

In some embodiments, obtaining the scanning image of the subject showing internal structure similar to that of the standard plane 313 includes moving the probe until a scanning image as close to the standard plane as possible is obtained. In some embodiments, step 313 includes calculating, by the processor, a similarity index between the scanning image and an image of the standard plane in the 3D model; and selecting, by the processor, the scanning image when the similarity index in equal to or larger than a predetermined value. In some embodiments, the processor selects the scanning image having the largest similarity index among a plurality of scanning images taken by the probe.

In some embodiments, calculating the similarity index includes converting, by the processor, the image of the standard plane and the scanning image to templates using a border detection algorithm; and calculating, by the processor, the similarity index by performing affine invariant template matching of the templates.

In some embodiments, calculation of the transformation matrix in step 315 is the same or similar to those as described above in step 207.

Figure 4C:
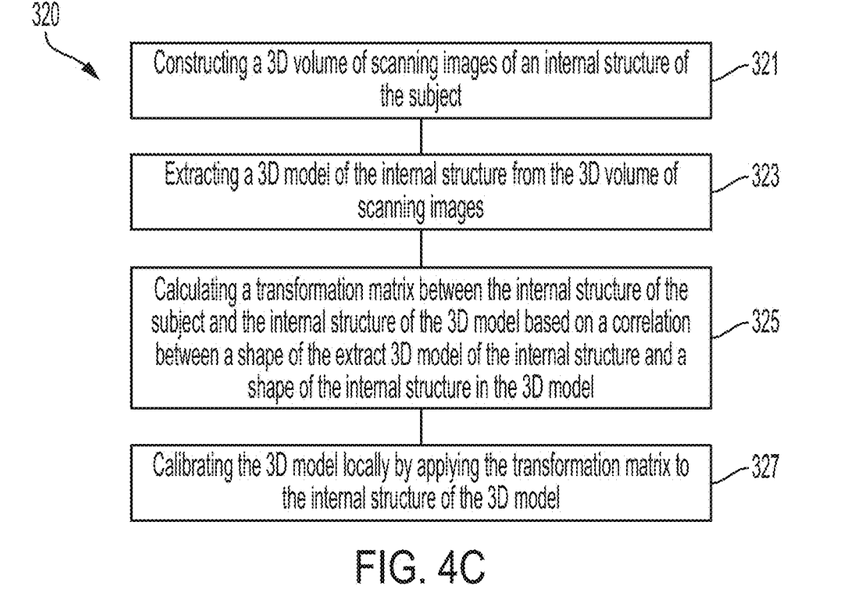
FIG. 4C is a flowchart of calibrating the 3D model locally by aligning a scanning image of an internal structure of the subject with a corresponding internal structure of the 3D model in accordance with some embodiments.

The steps 200 and 310 described above are able to address position, orientation and scale difference between the internal structures of the subject and the internal structures of the 3D model. Other than the position, orientation and scale, the shape of the same organ between two different subjects can also be different. To address the shape differences, the matrix can be calculated based on correlation between the reconstructed 3D model of the internal structure of the subject and the internal structure of the 3D model 320.

Figure 4D:
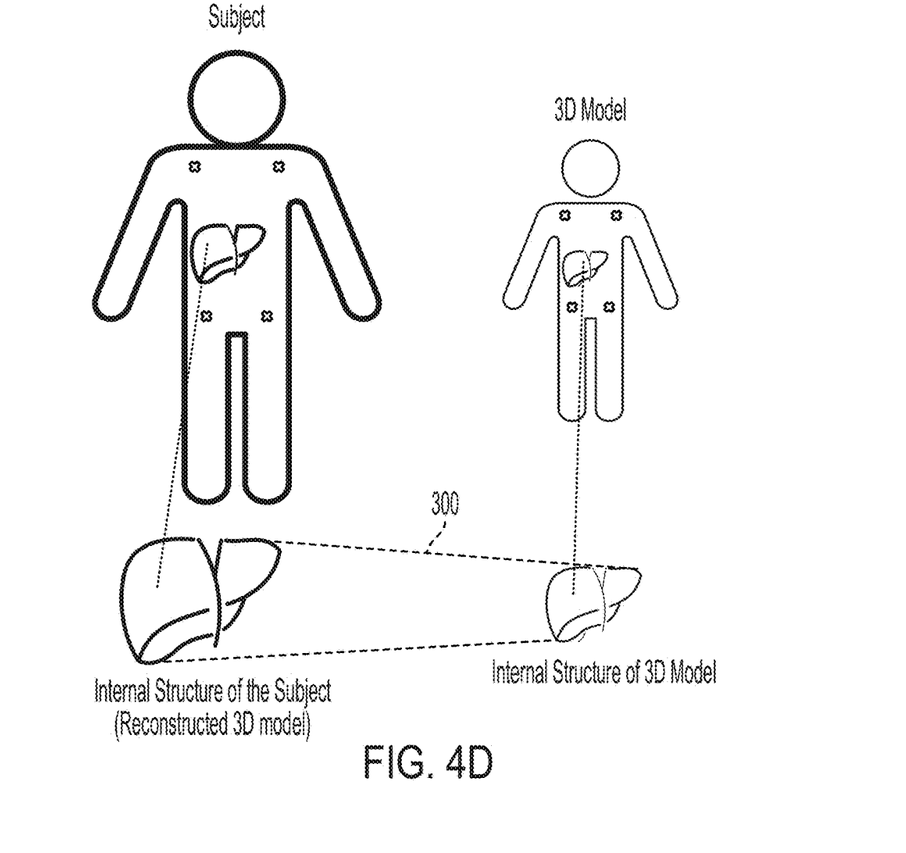
FIG. 4D is a medical image of a subject and a 3D model in accordance with some embodiments.

Referring to FIGS. 4C and 4D, in some embodiments, performing step 300 by correlating the reconstructed 3D model of the internal structure of the subject and the internal structure of the 3D model 320 includes: constructing, by the processor, a 3D volume of scanning images of the internal structure of the subject 321; extracting, by the processor, a 3D model of the internal structure from the 3D volume of scanning images 323; calculating, by the processor, a transformation matrix between the internal structure of the subject and the internal structure of the 3D model based on a correlation between a shape of the extract 3D model of the internal structure and a shape of the internal structure in the 3D model 325; and calibrating, by the processor, the 3D model locally by applying the transformation matrix to the internal structure of the 3D model 327.

In some embodiments, extracting the 3D model of the internal structure 321 includes extracting the 3D model of the internal structure from the 3D volume of scanning images by a segmentation algorithm.

In some embodiments, calculating the transformation matrix 325 includes: identifying, by the processor, surface points of the extracted 3D model of the internal structure; and calculating, by the processor, the transformation matrix using an iterative cloud point (ICP) algorithm based on the surface points. Since the number of surface points obtained from the 3D models of the internal structure can be quite large, in some embodiments, the surface points are decimated by the processor, thereby reducing the amount of computation and improving performance.

In some embodiments, the transformation is performed according to a morphing model. In some embodiments, during morphing, a list of control points on the model are shifted. In some embodiments, during morphing, the gravity center of the two models is used as reference and kept still, the surface points of the 3D model are adjusted so that these surface points will match the position of those on the subject.

In some embodiments, the correlation between the subject and the 3D model, as well as the transformation matrix obtained in steps 200 and 300 are used to train an artificial neural network system. Artificial neural networks such as convolutional neural networks have been widely experimented in many different areas given the fast increasing of the computing power due to the development of GPU, FPGA, ASIC, etc. and the increasing amount of data available. In general, an artificial neural network works as the follows: the artificial neural network is fed with large amount of training data, where the expected results are known. The weight factors of the artificial network are adjusted based on the error between the results produced by the network versus the expected results. When a sufficient amount of training data is fed to the artificial neural system, the neural network would produce results the way the results are expected. When new data which is not part of the training data is fed to the trained artificial neural networks, the network should produce a result, which can be used to make decision. This process is called inference. There are two type of results that an artificial neural network can produce: a discrete result or a continuous result. The discrete results are often used to solve classification problems and the continuous results are often used to solve regression problems.

Artificial neural network system as described above can be used in calculation of transformation matrix in steps 200, 310 and 320. Here, the use of the artificial neural network system will be described in reference to step 310.

In some embodiments, the method of registering the medical image of the subject with the 3D model of the subject further comprises displaying a virtual image slice on the 3D model corresponding to an image slice being generated by a probe 400. In some embodiments, the virtual image slice is shown in a virtual plane on the 3D model and includes a cross-section image of the internal structure. The virtual plane corresponds to the scanning plane of the probe, and the cross-section image corresponds to the cross-section of the internal structure being scanned.

In some embodiments, the registration problem is treated as classification problem. According to these embodiments, a set of virtual slices corresponding to the standard planes for a certain internal structure are generated. Then, a number of scanning images corresponding to the standard planes are obtained from a number of different subjects. The relationship between the scanning images and the slices from the 3D model is established and used to train the artificial neural network. After training, when given a new scanning image from a subject corresponding to the standard plane of the internal structure, the neural networks should be able to classify the image as corresponding to one of the virtual slices from the 3D model. Although ultrasound is uninhibited exploratory scanning, normally the scanning will follow some protocol of accredited institution when looking for standard planes. Therefore, being able to classify an ultrasound image as corresponding to one of the standard planes is enough.

In some embodiments, the registration problem is treated as regression problem. According to these embodiments, the results of the artificial neural network are the parameters that used to produce the matching slice. These parameters include translation and rotation angles. When a sufficient number of scanning images corresponding to the standard planes are acquired, the corresponding slices from the 3D model are obtained and the parameters used to obtain the slices are recorded. During the training of the artificial neural network, scanning images are used as input and known parameters of slice image corresponding to the scanning images are used as output. Once the training is finished, the training neural network is fed with a new scanning image and outputs a set of parameters. The set of parameters are then used to produce the matching slice in the 3D model. Since the parameter space is normally quite large, a larger amount of training data is required to get similar results compared to the solution when problem is treated as classification.

Apparatus of Registering a Medical Image of a Subject with a 3D Model

Figure 5:
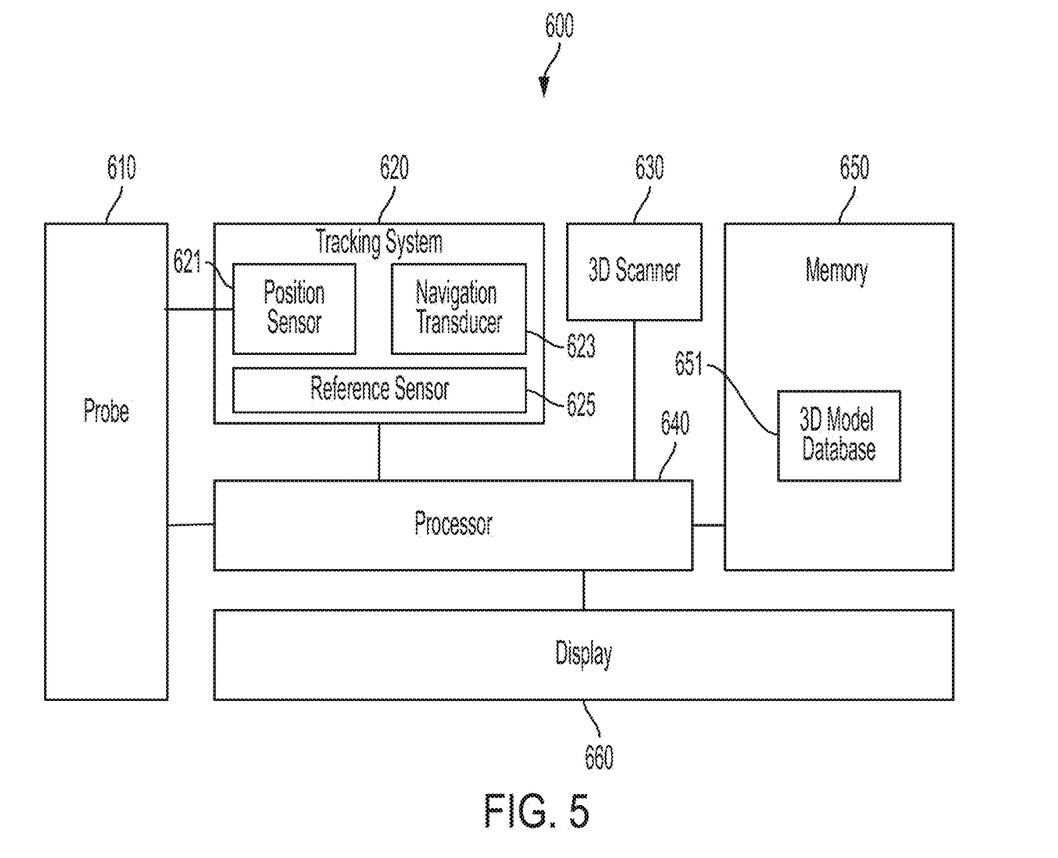
FIG. 5 is a diagram of an apparatus of registering a medical image of a subject with a 3D model of the subject in accordance with some embodiments.

In some embodiments, the instant specification is directed to an apparatus 600 of registering a medical image of a subject with a 3D model of the subject.

In some embodiments, the apparatus 600 registers the medical image with the 3D model by a method similar to those as described above.

In some embodiment, the apparatus 600 includes a tracking system 620; a processor 640; and a memory 650.

In some embodiments, the tracking system 620 includes: a position sensor 621 attached to a probe 610; and a navigation transducer 623. In some embodiments, the navigation transducer is configured to detect a position and an orientation of the probe 610 via the position sensor. In some embodiments, the tracking system 620 further includes a reference sensor 625 configured to be attached to the subject and detect the position of the subject. In some embodiments, the tracking system 620, including the components of tracking system 620, functions in a manner similar to those as detailed above.

In some embodiments, the apparatus 600 includes the probe 610. In some embodiments, the probe 610 is an ultrasound probe, such as an ultrasound transducer.

In some embodiments, apparatus 600 further includes a 3D scanner 630. In some embodiments, the 3D scanner 630 is configured to function in a similar manner to those as detailed above.

In some embodiments, the memory 650 stores a 3D model of the subject. In some embodiments, the 3D model includes a 3D model of an internal structure of the subject. In some embodiments, the memory includes a 3D model database 651, which includes a plurality of entries of 3D models. According to these embodiments, each entry of the plurality of entries is tagged with information regarding the 3D model entry, and a 3D model best represent the subject can be selected from the entries. In some embodiments, the 3D model database is similar to those as detailed above.

In some embodiments, the processor 640 is configured to: calibrate the 3D model globally by aligning markers on the subject with corresponding markers on the 3D model; and calibrate the 3D model locally by aligning a scanning image of the internal structure of the subject with the internal structure of the 3D model. In some embodiments, the manner the processor performs the global calibration and the local calibration are similar to those as detailed above.

In some embodiments, the processor 640 is further configured to select an initial 3D model representing the subject from a 3D model database by: comparing information of the subject with information tagged to entries of the 3D model database 651; and choosing the initial 3D model tagged with information that matches the information of the subject. In some embodiments, the information comprises a demographic information including a gender, a height, a weight, an ethnicity, or an age, a personal information comprising a body measurement, a body fat percentage (BFP), or a body mass index (BMI), or external dimensions.

In some embodiments, the processor 640 is configured to calibrate the 3D model globally by: receiving a location of the probe representing a location of a fiducial marker to record a real world location of the fiducial marker, wherein the fiducial marker is a marker located on an external surface of the subject corresponding to a marker on the 3D model; calculating a transformation matrix between the external surface of subject and the 3D model based on a correlation between the real world location of the fiducial marker and the virtual location of the corresponding marker; and calibrating the 3D model globally by applying the transformation matrix to the 3D model. In some embodiments, the transformation matrix is a rigid transformation matrix or an affine transformation matrix.

In some embodiments, the processor 640 is configured to calibrate the 3D model locally by: selecting a standard plane of the 3D model, wherein the stand plane includes a cross section of the internal structure in the 3D model; selecting a scanning image of the subject, wherein the scanning image includes a cross section of the internal structure similar to the cross section in the standard plane; calculating a transformation matrix between the two cross sections; and calibrating the 3D model locally by applying the transformation matrix to the internal structure of the 3D model.

In some embodiments, the processor is configured to select the scanning image of the subject including the cross section of the internal structure similar to the cross section included in the standard plane by: calculating a similarity index between the scanning image and an image of the standard plane in the 3D model; and selecting the scanning image when the similarity index in equal to or larger than a predetermined value.

In some embodiments, the processor is configured to calculate the similarity index by: converting the image of the standard plane and the scanning image to templates using a border detection algorithm; and calculating the similarity index by performing affine invariant template matching of the templates.

In some embodiments, the processor 640 is configured to calibrate the 3D model locally by: constructing a 3D volume of scanning images of the internal structure of the subject; extracting a 3D model of the internal structure from the 3D volume of scanning images; calculating a transformation matrix between the internal structure of the subject and the internal structure of the 3D model based on a correlation between a shape of the extract 3D model of the internal structure and a shape of the internal structure in the 3D model; and calibrating the 3D model locally by applying the transformation matrix to the internal structure of the 3D model.

In some embodiments, the processor 640 is configured to extract the 3D model of the internal structure by: extracting the 3D model of the internal structure from the 3D volume of scanning images by a segmentation algorithm.

In some embodiments, the processor 640 is configured to calculate the transformation matrix by: identifying surface points of the extracted 3D model of the internal structure; and calculating the transformation matrix using an iterative cloud point (ICP) algorithm based on the surface points.

In some embodiments, the processor 640 is configured to calculate the transformation matrix by: calculating a gravity center of the extracted 3D model of the internal structure; and calculating the transformation matrix based on the gravity center.

In some embodiments, the apparatus 600 further includes a display configured to display a virtual image slice on the 3D model corresponding to an image slice being generated by the probe 610.

In some embodiments, the processor 640 is configured to calibrate the 3D model locally by: training an artificial neural network system by feeding the artificial neural network system with training data comprising images of internal structures and corresponding 3D models of internal structures having known expected results; and calibrating the internal structure of the 3D model by applying the trained artificial neural network.

In some embodiments, the processor is one single processor. In some embodiments, the processor is a plurality of processors. In some embodiments, the processor includes a central processing unit (CPU), a graphics processing unit (GPU), a field programmable gate array (FPGA) processor, an application-specific integrated circuit (ASIC) processor, or a combination thereof.

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of registering a medical image of a human with a three-dimensional (3D) model, comprising:

calibrating, by a processor, the 3D model globally by aligning fiducial markers on the human with corresponding markers on the 3D model to create a globally-calibrated 3D model; and then calibrating, by the processor, the globally-calibrated 3D model locally by aligning a scanning image of an internal structure of the human with a corresponding internal structure of the globally-calibrated 3D model, wherein the calibrating the globally-calibrated 3D model locally includes calculating, by the processor, a local transformation matrix; and calibrating, by the processor, the globally-calibrated 3D model locally by applying the local transformation matrix to the internal structure of the globally-calibrated 3D model, wherein calibrating the globally-calibrated 3D model locally comprises:

constructing, by the processor, a 3D volume of scanning images of the internal structure of the human;

extracting, by the processor, a 3D model of the internal structure from the 3D volume of scanning images;

calculating, by the processor, the local transformation matrix between the internal structure of the human and the internal structure of the globally-calibrated 3D model based on a correlation between a shape of the extracted 3D model of the internal structure and a shape of the internal structure in the globally-calibrated 3D model; and calibrating, by the processor, the globally-calibrated 3D model locally by applying the local transformation matrix to the internal structure of the globally-calibrated 3D model, and wherein calculating the local transformation matrix comprises:

calculating, by the processor, a gravity center of the extracted 3D model of the internal structure; and calculating, by the processor, the local transformation matrix based on the gravity center.

2. The method of claim 1, further comprising selecting an initial 3D model representing the human from a 3D model database, wherein selecting the initial 3D model comprises:

comparing, by the processor, information of the human with information tagged to entries of the 3D model database; and choosing, by the processor, the initial 3D model tagged with information that matches the information of the human.

3. The method of claim 2, wherein the information comprises a demographic information including a gender, a height, a weight, an ethnicity, an age, a body measurement, a body fat percentage (BFP), or a body mass index (BMI), or external dimensions.

4. The method of claim 1, wherein calibrating the 3D model globally comprises:

selecting a marker on the 3D model corresponding to one of the fiducial markers on the human;

moving a probe to the fiducial marker to record a location of the probe to derive a real world location of the one of the fiducial markers;

calculating, by the processor, a global transformation matrix between an external surface of the human and the 3D model based on a correlation between the real world location of the fiducial markers and a virtual location of the corresponding markers; and calibrating, by the processor, the 3D model globally by applying the global transformation matrix to the 3D model.

5. The method of claim 4, wherein the global transformation matrix is a rigid global transformation matrix or an affine global transformation matrix.

6. The method of claim 1, wherein extracting the 3D model of the internal structure comprises:
   extracting the 3D model of the internal structure from the 3D volume of scanning images by a segmentation algorithm.

7. The method of claim 1, further comprising displaying a virtual image slice on the 3D model corresponding to an image slice being generated by a probe.

8. An apparatus of registering a medical image of a human with a 3D model, comprising:
   a tracking system, comprising:
   a position sensor, wherein the position sensor is attachable to a probe; and
   a navigation transducer, wherein the navigation transducer is configured to detect a position and an orientation of the probe via the position sensor;
   a memory for storing a 3D model of the human, wherein the 3D model includes an 3D model of an internal structure of the human; and
   a processor connected to the tracking system, wherein the processor is configured to:
   calibrate the 3D model globally by aligning fiducial markers on the human with corresponding markers on the 3D model to create a globally-calibrated 3D model; and then
   calibrate the globally-calibrated 3D model locally by aligning a scanning image of the internal structure of the human with the internal structure of the globally-calibrated 3D model,
   wherein the processor is configured to calibrate the globally-calibrated 3D model locally by:
   calculating, by the processor, a local transformation matrix; and
   calibrating, by the processor, the globally-calibrated 3D model locally by applying the local transformation matrix to the internal structure of the globally-calibrated 3D model,
   wherein the processor is configured to calibrate the globally-calibrated 3D model locally by:
   constructing a 3D volume of scanning images of the internal structure of the human;
   extracting a 3D model of the internal structure from the 3D volume of scanning images;
   calculating the local transformation matrix between the internal structure of the human and the internal structure of the globally-calibrated 3D model based on a correlation between a shape of the extracted 3D model of the internal structure and a shape of the internal structure in the globally-calibrated 3D model; and
   calibrating the globally-calibrated 3D model locally by applying the local transformation matrix to the internal structure of the globally-calibrated 3D model, and
   wherein the processor is configured to calculate the local transformation matrix by:
   calculating, by the processor, a gravity center of the extracted 3D model of the internal structure; and
   calculating, by the processor, the local transformation matrix based on the gravity center.

9. The apparatus of claim 8, wherein the memory stores a database of 3D models, and the processor is further configured to select an initial 3D model representing the human from a 3D model database by:
   comparing information of the human with information tagged to entries of the 3D model database; and
   choosing the initial 3D model tagged with information that matches the information of the human.

10. The apparatus of claim 8, wherein the processor is configured to calibrate the 3D model globally by:
   receiving a location of the probe representing a location of one of the fiducial markers to record a real world location of the one of the fiducial markers, wherein the one of the fiducial markers is a marker located on an external surface of the human corresponding to a marker on the 3D model;
   calculating a global transformation matrix between the external surface of the human and the 3D model based on a correlation between the real world location of the fiducial markers and a virtual location of the corresponding markers; and
   calibrating the 3D model globally by applying the global transformation matrix to the 3D model.

* * * * *